United States Patent [19]

Clark, Jr. et al.

[11] Patent Number: 4,548,982
[45] Date of Patent: Oct. 22, 1985

[54] DRILLING FLUIDS

[75] Inventors: Earl Clark, Jr.; Howard B. Irvin, both of Bartlesville, Okla.

[73] Assignee: Phillips Petroleum Company, Bartlesville, Okla.

[21] Appl. No.: 528,922

[22] Filed: Sep. 2, 1983

[51] Int. Cl.$^4$ .............................................. C08L 33/02
[52] U.S. Cl. .............................. 524/556; 252/8.55 R; 525/329.9; 524/446
[58] Field of Search ............................ 525/378, 329.9; 524/446, 560, 556

[56] References Cited

U.S. PATENT DOCUMENTS

| | | | |
|---|---|---|---|
| 2,607,762 | 8/1952 | Bowen | 260/78.5 |
| 2,621,169 | 12/1952 | Robinette et al. | 260/78.5 |
| 3,053,814 | 9/1962 | Hedrick | 260/78.5 |
| 3,297,614 | 1/1967 | Pueschner | 524/446 |
| 3,347,811 | 10/1967 | Bissot | 524/556 |
| 3,392,131 | 7/1968 | Miles | 524/556 |
| 3,687,906 | 8/1972 | Hanson et al. | 260/78.5 T |
| 3,753,965 | 8/1973 | Looney | 525/378 |
| 3,887,509 | 6/1975 | Bolstad et al. | 260/29.1 R |
| 3,981,987 | 9/1976 | Linke | 525/378 |
| 3,985,659 | 10/1976 | Felicetta | 524/446 |
| 4,125,700 | 11/1978 | Graham | 204/159.16 |
| 4,167,502 | 9/1979 | Lewis | 524/556 |
| 4,278,583 | 7/1981 | Sekiya | 524/446 |
| 4,351,754 | 9/1982 | Dupre | 524/446 |
| 4,374,939 | 2/1983 | Fisk | 524/446 |

Primary Examiner—Paul R. Michl
Attorney, Agent, or Firm—French and Doescher

[57] ABSTRACT

Polymers derived by copolymerizing a hydrophilic vinyl monomer, such as acrylic acid or methacrylic acid, with at least one hydrophobic vinyl monomer, such as an acrylic acid ester, a methacrylic acid ester, a vinyl ester of a saturated monocarboxylic acid having from 1 to 3 carbon atoms, and the like, prepared in a suitable inert, low chain transfer, organic liquid medium, such as n-pentane, n-hexane, cyclohexane, and chlorofluorocarbons such as 1,1,2-trichloro-1,2,2-trifluoroethane, and neutralized by anhydrous ammonia while still slurried in the inert low chain transfer organic liquid medium, perform effectively as water loss additives for drilling fluids under high temperature conditions. Such water loss control additives are especially effective when employed in drilling fluids having high solids content. Other copolymerization techniques for preparing such polymers are also disclosed. Also disclosed are drilling fluids employing such water loss control additives as well as a method of drilling a borehole in the earth using drilling fluids employing such water loss control additives.

29 Claims, No Drawings

DRILLING FLUIDS

Drilling fluids are used in the drilling of oil and gas wells to cool and lubricate the rotating drill bit and drill string shaft, convey rock cuttings to the earth surface for removal, prevent loss of water and drilling fluids into the formation through which the borehole is being drilled, and to control the entry of liquids into the borehole from the various formations being penetrated during the drilling. To accomplish these ends, a drilling fluid, generally referred to as drilling mud, comprises several components. For example, weighting solids such as barites are often added to such drilling muds to develop the desired density in the mud, while bentonite or various clays are often added to increase the drilling mud viscosity to improve the capability of the drilling muds to convey rock cuttings upwardly through the borehole from the drill bit and remove the cuttings from the borehole.

It is also known to add various polymers to drilling fluids or drilling muds to function as viscosifiers, dispersants and water loss additives in the drilling fluids. The use of polymers for such purposes meets with many problems. Such polymers are often unstable at high borehole temperatures, e.g., temperatures around about 360° F. (182° C.), and tend to lose their desired physical characteristics, such as plastic viscosity, yield point and resistance to water loss. The previous use of polymers for water loss control in drilling fluids has often resulted in an undesirable increase in viscosity of the drilling fluids.

The present invention provides polymers suitable for use as water loss additives for drilling fluids and methods for the preparation thereof which overcome the disadvantages encountered with previous polymers noted above. The present invention also provides drilling fluids employing such polymers and methods of using such drilling fluids.

It is an object of the present invention to provide improved drilling fluid additives.

Another object of the present invention is to provide an improved method of producing drilling fluid additives.

A further object of the present invention is to provide an improved method of drilling a borehole.

Another object of the present invention is to provide an improved drilling fluid additive which is readily dispersible in aqueous drilling fluids.

Yet another object of the present invention is to provide a method of producing drilling fluid additives which is characterized by increased simplicity and efficiency.

Still another object of the present invention is to provide an improved drilling fluid for use in the drilling of a borehole.

Yet another object of the present invention is to provide an improved drilling fluid which exhibits high temperature stability over extended periods of time.

Another object of the present invention is to provide an improved drilling fluid which provides enhanced water loss control characteristics.

A further object of the present invention is to provide an improved drilling fluid additive characterized by enhanced water loss control characteristics coupled with a minimum increase in viscosity when employed in a drilling fluid.

As used herein, the term, copolymer, includes any polymer comprising two or more monomers; and the term, copolymerization, means the polymerization of two or more monomers.

The foregoing and other objects, advantages and aspects of the present invention will become readily apparent from the following detailed description of the invention and the appended claims.

The polymers of this invention which are employed with drilling fluids as water loss additives after at least partial neutralization are, preferably, those polymers derived from copolymerizing a hydrophilic vinyl monomer selected from among acrylic acid (AA), methacrylic acid (MAA), other related monomers and mixtures of any two or more thereof with at least one hydrophobic vinyl monomer selected from among acrylic acid esters, such as, for example, methyl acrylate and ethyl acrylate, methacrylic acid esters, such as, for example, methyl methacrylate and ethyl methacrylate, vinyl esters of saturated monocarboxylic acids having 1 to 3 carbon atoms, such as, for example, vinyl formate and vinyl acetate, other related monomers, and mixtures or combinations of any two or more thereof. Presently preferred polymers of this invention are those selected from among an acrylic acid-methyl methacrylate copolymer (AA-MMA), a methacrylic acid-methyl acrylate copolymer (MAA-MA), a methacrylic acid-methyl methacrylate copolymer (MAA-MMA), an acrylic acid-vinyl acetate copolymer (AA-VA), and an acrylic acid-methyl methacrylate-vinyl acetate terpolymer (AA-MMA-VA).

The polymers are prepared in any suitable inert, low free radical chain transfer, organic liquid medium. Nonpolar diluents or solvents such as n-pentane, n-hexane, cyclohexane, chlorofluorocarbons such as 1,1,2-trichloro-1,2,2-trifluoroethane, and mixtures of any two or more thereof, are preferred since the polymer formed is insoluble in the medium and can be readily separated therefrom, if desired, by suitable means such as filtration. The diluent or solvent 1,1,2-trichloro-1,2,2-trifluoroethane is commercially available under the registered trademark Freon-113 ®. The separated product can be washed, dried, slurried in water and treated with an appropriate amount of sodium hydroxide to obtain the sodium salt as an aqueous solution. An appropriate amount of sodium hydroxide for this purpose would be, for example, an amount sufficient to raise and maintain the pH of the mixture to a value in the range of from about 5.3 to about 12, preferably from about 5.5 to about 11, and more preferably from about 6 to about 8.

It is possible to neutralize polyacids or polymers containing carboxyl groups by adding at least one suitable base to a slurry of such a polyacid or acidic polymer or copolymer comprising such polyacid and an organic reaction medium in which the polymerization forming the polyacid or acidic polymer or copolymer took place. While any base can be employed which will effect the desired neutralization of the polyacid or acidic polymer or copolymer and produce the desired salt form thereof, examples of suitable bases include, but are not limited to, sodium hydroxide, potassium hydroxide, and sodium carbonate. Such bases can be in dry form or liquid form, and can be in concentrated form such as, for example, an aqueous solution. Such a neutralization process can be advantageously employed in neutralizing copolymers prepared in an inert, low chain transfer, organic medium as described in the immediately preceding two paragraphs.

We have discovered that it is possible, and, under certain circumstances, highly advantageous, to neutralize polyacids or polymers containing carboxyl groups under completely anhydrous conditions. More particularly, we have discovered that such neutralization can be accomplished by adding anhydrous ammonia to a slurry of such a polyacid or acidic polymer comprising such polyacid or acidic polymer in an organic reaction medium in which the polymerization forming the polyacid or acidic polymer or copolymer took place. Since water is neither present in the neutralizing reaction mixture nor formed in the neutralization reaction, the problems associated with the presence of water are thereby avoided. For example, the presence of even a small amount of water can sometimes cause clumping of the acidic polymer particles causing these particles to be difficult to process further or difficult to dry as in the removal of residual organic reaction medium or solvent from the neutralized polymer subsequent to the polymerization/neutralization reaction procedures. It is also undesirable, of course, to ship quantities of water along with the polymer for nearly every conceivable application of such neutralized polymer.

Neutralization of the acidic polymers or copolymers with anhydrous ammonia in accordance with the present invention is carried out to the extent that at least 50% and preferably at least 75% of the available carboxyl groups in the acidic polymer are converted to the ammonium salt form. More preferably, it is desired that essentially 100% of the available carboxyl groups in the acidic polymers are converted to the ammonium salt form. Under these conditions, the amount of ammonia employed will be that necessary to achieve the desired level of neutralization in the acidic polymer. Because ammonia is rather inexpensive, it is most often practical to employ a considerable excess of the theoretical amount of ammonia required for 100% neutralization of the carboxyl group and conversion to the corresponding ammonium salt form.

While this neutralization process is generally applicable to the neutralization of any suitable polyacid or acidic polymer or copolymer, it is presently preferred to employ the process with polymer- or copolymer-reaction medium slurries containing from about 1 wt.% to about 25 wt.% solids, and, more preferably, from about 5 wt.% to about 15 wt.% solids based on the total weight of the slurry.

While any quantity of anhydrous ammonia, preferably in gas or vapor form, can be employed in the neutralization of acid polymers or copolymers in a polymer- or copolymer-reaction medium slurry which will achieve the desired degree of neutralization of the polymer or copolymer, it is generally preferable to use a quantity of anhydrous ammonia which will raise and maintain the pH of the neutralized polymer or copolymer to a value in the range from about 5.3 to about 12, more preferably in the range from about 5.5 to about 11, and more preferably still in the range from about 6 to about 8 for a polymer solution in water of at least about 1 wt. % concentration. The pH of such neutralized polymers or copolymers should be at least 7 to indicate adequate neutralization of the acidic polymers, especially for use as water loss control additives in drilling mud compositions.

A free radical initiator is normally employed in the polymerization process. Such initiators are well known in the art and include azo compounds such as azobisisobutyronitrile and organic peroxy compounds such as t-butyl peroxypivalate. The amount of initiator used, based on the weight of monomers employed, depends on the monomers chosen as well as the chosen reaction medium and the polymer molecular weight desired. Sufficient initiator is employed such that the weight average molecular weight of the resulting polymers will range from about 100,000 to about 1,000,000. For example, when preparing the acrylic acid-methyl methacrylate copolymers in n-hexane with t-butyl peroxypivalate as the initiator, the initiator level can range from about 0.05 to about 1.0 weight percent, preferably from about 0.1 to about 0.8 weight percent, based on the weight of monomers charged. In addition, irradiation with ultraviolet light or gamma rays from a radioisotope such as $Co^{60}$ can also serve as free radical sources for the polymerization process. When using ultraviolet radiation, sensitizing compounds can be employed to promote radical forming reactions as is known in the art.

The mole ratio of hydrophilic monomer or monomers to hydrophobic monomer or monomers can be any mole ratio which provides a copolymer having the desired characteristics, but the mole ratio generally can range from about 22:1 to about 1:1, preferably from about 7:1 to about 1:1, and more preferably from about 3.5:1 to about 2:1. For example, for the acrylic acid, methyl methacrylate copolymers, the AA-MMA mole ratios range from about 3.2:1 to 2.1:1, corresponding to a AA-MMA weight ratio range from about 70:30 to about 60:40. For the methacrylic acid-methyl methacrylate copolymer, the MAA-MMA weight ratio can range generally from about 95:5 to about 46:54, and from about 80:20 to about 60:40 for best results. For the acrylic acid-methyl methacrylate-vinyl acetate copolymer, the weight ratios of AA-MMA-VA can range from about 60-30-10 to about 60-10-30 and from about 70-20-10 to about 70-10-20 for best results. The equivalent mole ratios are in the range from about 2.8:1:0.33 to about 8.3:1:3.5 and from about 4.8:1:0.58 to about 9.7:1:2.3.

Generally, in preparing the polymers of the instant invention, the total monomer level with respect to the reaction medium can range from about 5 to about 30 weight percent, more preferably from about 10 to about 20 weight percent based on the weight of the reaction medium.

Polymerization temperatures are generally in the range conventionally practiced and can range, for example, from about 25° C. to about 100° C., preferably from about 50° C. to about 70° C., and most preferably at about 50° C. for the best results. The polymers prepared at about 50° C. exhibit the best control of water loss in the tests used.

Each polymerization was conducted for a sufficient length of time to obtain substantially quantitative conversion. Generally, a polymerization time in the range from about 10 minutes to about 30 hours is satisfactory. More specifically, when about 20 g of total monomers are employed in about 200 mL of reaction medium containing from about 0.1 to about 1.5 weight percent, and preferably from about 0.1 to about 0.8 weight percent t-butyl peroxypivalate and a reaction temperature ranging from about 50° C. to about 70° C., a polymerization time of from about 15 to about 30 hours is used for convenience; however, the conversion is substantially complete in less than four hours. In commercial operations, it may be desirable to reduce the polymerization time to about one hour or less, or even to about 10 minutes.

The anhydrous ammonia is conveniently charged as a gas or vapor, as noted above, preferably to a transfer line wherein the acidic polymer is being transferred from the polymerization zone to a suitable solvent-/polymer separation zone. Various conventional mixing devices can be employed for contacting the slurry comprising acidic polymer and reaction medium with anhydrous ammonia in such a transfer line. For example, static mixers can be advantageously employed in the transfer line as can other conventional mixing devices.

While any suitable pressure can be employed in the neutralization step which will achieve the desired degree of neutralization of the acidic polymer, such pressure would generally be greater than atmospheric pressure and can be as high as 100 psig.

While any temperature can be employed in the neutralization step which can achieve the desired degree of neutralization of the acidic polymer, such neutralization temperature can generally be within the range from about 20° to about 100° C. It should be noted that excessively high neutralization temperature may cause the elimination of water from the resulting ammonium salt and the generation of the amide form which is not desired.

While any suitable reaction time can be employed in the neutralization process which will achieve the desired degree of neutralization of the acidic polymer, the reaction time can generally range from about a few seconds up to about 1 hour. The neutralization reaction is extremely rapid, as would be expected, and all that is required is that good mixing be achieved between the anhydrous ammonia and the acidic polymer in the contacting step.

It will be understood that the neutralization step can be advantageously carried out in a continuous fashion or, if desired, in a batch process.

The extent of neutralization of the acidic polymer can be indicated in at least two ways. First, the pH of a water solution of the neutralized polymer having a concentration of about 1 wt. % can be measured. The pH of such solution should generally be in the range from about 5.3 to about 12. For best results, the pH of such solution should be at least about 7 to indicate adequate neutralization of the acidic polymer, especially for use as water loss control additives in drilling mud compositions. It is also possible to determine the extent of neutralization of the acidic polymer by measuring the weight gain of the neutralized polymer over unneutralized polymer per fixed weight of reaction medium following separation from the reaction mixture. Under careful handling, this gravimetric process can show the extent of carboxyl group neutralization by the weight gain from the ammonia reacted with the carboxyl groups.

The neutralized polymer prepared according to the process of the instant invention can be recovered from the neutralization reaction mixture by any of a variety of methods, such as, for example, decantation of the liquid phase and evaporation of any residual solvent or unreacted ammonia. Filtration of the reaction mixture can also be carried out followed by further drying of the filtrate to remove traces of solvent and unreacted ammonia. It is usually neither practical nor economical to attempt to recover any excess ammonia from the polymer recovery step, although such recovery is possible. Solvent removal, however, can be carried out with recycle of any recovered solvent back to the polymerization step. It is often convenient to utilize an inert gas purge or sparge to remove traces of solvent from the neutralized polymer particles.

Because of the nature of the original polymerization mixture as a slurry in the inert low chain transfer organic liquid medium or solvent it is usually not necessary to treat the recovered neutralized polymer by grinding or other comminution processes to reduce the particle size since the neutralized polymer particles are quite soluble in water.

EXAMPLE I

A copolymer of acrylic acid/methylmethacrylate (60/40) was prepared as a slurry in hexane diluent utilizing tertiary butyl peroxypivalate (Lupersol-11) as the polymerization initiator. The recipe employed in the polymerization is shown below.

POLYMERIZATION RECIPE

Acrylic acid, 12 g; methyl methacrylate, 8 g; tertiary butyl peroxypivalate, 0.2 g; n-hexane, 200 mL.

The total polymerization slurry recipe was charged to a 10 ounce beverage bottle and the bottle capped and purged with a stream of nitrogen. After polymerization in the bottle reactor for 18.5 hours at 50° C., quantitative conversion to polymer was achieved. To a second 10 ounce beverage bottle reactor was charged 40 mL of the resulting polymerized mixture and this bottle reactor was then pressured to 50 psig with anhydrous ammonia and the mixture shaken vigorously upon which the pressure dropped to 15 psig. The second bottle was then placed in 50° C. bath for three hours and the final pressure reading was 5 psig. The liquid was decanted from the slurry and the solid neutralized polymer purged with nitrogen under twenty inches of mercury vacuum over night. The polymer was then added to about 25 mL of water and dissolved readily.

This example demonstrates the ready neutralization of acidic polymer prepared in hydrocarbon slurry with anhydrous ammonia to form a neutralized polymer which readily dissolves in water.

EXAMPLE II

Two neutralized polymers were prepared according to the instant invention for evaluation as water loss control additives in drilling muds. Both polymers were acrylic acid/methyl methacrylate (60/40) copolymers polymerized in n-hexane slurry as in Example I above.

The polymerization slurry for the polymer of Run 1 was neutralized by charging to the capped beverage bottle $NH_3$ to 50 psig then shaking until the pressure dropped to about 10 psig. This procedure was repeated for a total of seven times. During this procedure the bottle warmed to about 40° C. The bottle was then placed in a 50° C. constant temperature bath for 1 hour. The pressure was 10 psig at this time. The polymer (18.3 g) was recovered in the same manner as in Example I and then dissolved in 73.1 mL $H_2O$ to provide a solution of 16.7% solids. The viscosity of this solution was 10,464 cps as measured with a Brookfield Viscosimeter Model BHT, #4 spindle, 100 rpm at 25° C.

The polymer for Run 2 was neutralized and recovered in the same fashion as the polymer of Run 1 but the polymer was not dissolved in water for testing in the drilling mud compositions described below.

Polymers from Runs 1 and 2 were tested at about 25° C. in Base Mud A-3.5 wt. % attapulgite clay in 5% NaCl aqueous solution and Base Mud B-3.5 wt. % attapulgite clay in saturated NaCl aqueous solution at two different polymer concentrations. The results of these tests are shown in Table I.

The results from these runs are shown in Table III below.

TABLE I

| Run No. | Polymer Conc. lb/bbl | Base Mud A PV/YP[a] | Gels[b] | pH | WL[c] | Base Mud B PV/YP[a] | Gels[b] | pH | WL[c] |
|---|---|---|---|---|---|---|---|---|---|
| 1 | 1 | 3/1 | 0/0 | 7.7 | 17.0 | 6/1 | 0/1 | 7.2 | 15.5 |
|   | 3 | 7/1 | 0/0 | 7.0 | 7.0 | 13/2 | 0/1 | 5.8 | 4.6 |
| 2 | 1 | 3/1 | 1/1 | 7.3 | 17.5 | 6/1 | 1/3 | 6.3 | 31.0 |
|   | 3 | 7/1 | 1/1 | 5.3 | 9.0 | 9/17 | 1/11 | 5.0 | 84.0 |
| | | | | | | Retested after pH adjustment[d] | | | |
| 2 | 1 | — | — | — | — | 5/2 | 0/1 | 8.3 | 30.0 |
|   | 3 | — | — | — | — | 17/1 | 0/1 | 7.6 | 5.5 |
| — | 0 | — | — | — | 173 | — | — | — | 138 |

[a]PV is Plastic Viscosity, cp YP is yield Point, lb/100 ft$^2$
[b]Gels is Gel Strength, 10 sec/10 min, lb/100 ft$^2$
[c]WL is Water Loss, API, mL/30 min
[d]NaOH added to increase pH The results in Table I indicate that the polymers of Runs 1 and 2 were effective in providing water loss control for Base Muds A and B. The pH values also indicate that the polymers may not have been adequately neutralized, especially the polymer of Run 2, since pH adjustment with NaOH gave improved water loss control.

EXAMPLE III

Copolymers of acrylic acid and methyl methacrylate (70/30) were prepared as slurries in cyclohexane (1,000 phm) with 1 phm t-butyl peroxypivalate (Lupersol-11) as initiator. Polymerization was carried out at 50° for 16.75 hours. Various reagents were employed to neutralize the slurries, each containing 50 g of polymer, and the neutralized polymers dried overnight in an air oven at 60° C. The polymers were then tested in Base Muds A and B at about 25° C. and High Temperature Mud C for water loss control. The results of these tests are shown in Table II below.

TABLE II

| | | WL Values, mL/30 min | | | | |
|---|---|---|---|---|---|---|
| | | Mud A | | Mud B | | |
| Run No. | Neutralizing Agent, g | 1 lb/bbl | 3 lb/bbl | 1 lb/bbl | 3 lb/bbl | Mud C[c] 2 lb/bbl |
| 3 | NH$_3$, 8.26 | 16 | 8.5 | 148 | 16 | 46 |
| 4 | (NH$_4$)$_2$CO$_3$, 46.67 | 16 | 9 | 141 | 112 | 46 |
| 5 | NH$_4$OH[a], 56.71 | — | — | — | — | — |
| 6 | NaOH[b], 38.89 | 32 | 11 | 89 | 7.9 | 32 |

[a]30% aqueous solution. Reaction mixture clumped together as a single mass. Polymer was not recovered.
[b]50% aqueous solution.
[c]Base mud C was prepared from 2.7% bentonite clay, 9.15% P95 illite clay, and 30% barite in 4% aqueous NaCl. Each sample was treated with 5 lb/bbl Tannathin lignite and 2 lb/bbl Desco ® thinner with NaOH to pH 10.5 before addition of polymer. Water loss values (HTWL) for this mud were measured at 325° F. under 500 psi.

Results in Table II show the inventive neutralization method, Run 3, gave equal or better results than the prior art method using (NH$_4$)$_2$CO$_3$, Run 4, but neither were as good as 50% aq NaOH in Muds B and C.

EXAMPLE IV

A series of methacrylic acid/methyl methacrylate (80/20) copolymers was prepared in cyclohexane slurry form as in Example III and the polymer neutralized with various agents as in Example III. The recovered neutralized polymers were tested as water loss control agents in drilling muds A, B and C as in Example III.

TABLE III

| | | WL Values, mL/30 min | | | | |
|---|---|---|---|---|---|---|
| | | Mud A | | Mud B | | |
| Run No. | Neutralizing Agent, g | 1 lb/bbl | 3 lb bbl | 3 lb bbl | 3 lb bbl | 2 lb/bbl |
| 7 | NH$_3$, 7.91 | 71 | 35 | 60 | 29 | 34 |
| 8 | (NH$_4$)$_2$CO$_3$, 44.65 | 77 | 55 | 72 | 43 | 32 |
| 9 | NH$_4$OH[a], 54.26 | — | — | — | — | — |
| 10 | NaOH[b], 37.20 | 70 | 42 | 69 | 31.5 | 26 |

[a]30% aqueous solution. Reaction mixture clumped together as a single mass. Polymer was not recovered.
[b]50% aqueous solution.
[c]Base mud C was prepared from 2.7% bentonite clay, 9.15% P95 illite clay, and 30% barite in 4% aqueous NaCl. Each sample was treated with 5 lb/bbl Tannathin lignite and 2 lb/bbl Desco ® thinner with NaOH to pH 10.5 before addition of polymer. Water loss values (HTWL) for this mud were measured at 325° F. under 500 psi.

The water loss results in Table III show that the inventive neutralization method of Run 7 was better than the prior art method of Run 8 in Muds A and B and essentially equal to Run 8 in Mud C. The method of Run 7 was also equal or slightly better than the use of 50% aq. NaOH (Run 10) in Muds A and B but slightly poorer in Mud C.

The use of the in situ neutralization of polyacids or acidic polymers or copolymers as described above simplifies the production of such polymer salts for use as drilling fluid additives or the like by eliminating a separate neutralization step after separating the polymer from the reaction medium. Furthermore, the use of such simplified one-step preparation of dry polyacid or acid polymer or copolymer salts in combination with subsequent drying of such salts provides polyacid or acidic polymer or copolymer salts which are readily dispersible in aqueous solutions, such as drilling fluids, and provides dry, water-dispersible products which can be economically packaged, transported and handled until such times as it is desired to directly introduce such dry products into the aqueous solutions of interest, such as, for exaple, drilling fluids.

As discussed earlier, the polymers of this invention are preferably employed as the ammonium salts since the salts are water soluble. However, it is possible to use the acid forms of the polymers alone although this is less preferred because the polymers in this form do not dissolve well in aqueous solutions. In fact, when the methyl methacrylate content of these polymers is in the range from about 30 weight percent or higher, the acid forms of the polymers are insoluble in water. In spite of this factor, the acid forms of the polymers are capable of acting as water loss control agents.

Although not previously emphasized, another feature of the polymers of the present invention is that they contribute little or not at all to the viscosity of the mud in which they are placed. This feature is of extreme importance when the polymers are to be added to muds having a high solids content.

In operation, the drilling fluids or muds described above are preferably circulated downwardly through a tubular drill string and out through the drill bit on the lower end of the drill string in the bottom of a borehole. The drilling fluids are further circulated upwardly through the annulus between the drill string and the wall of the borehole whereby cuttings from the bottom of the borehole are conveyed to the earth's surface and the polymeric water loss additive of the drilling fluid contacts the penetrated formations to control water loss from the borehole into the thus contacted formations. After each passage of the drilling fluids through the drill string and borehole annulus the drilling fluid is preferably passed through a settling tank or trough where sand and drill cuttings are separated, with or without screening. The drilling fluid is then again pumped into the drill string by a mud pump to continue the circulation as described.

From the foregoing it will be seen that the polymers of the instant invention readily achieve the objects and advantages set forth above. Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the instant disclosure. Accordingly, modifications are contemplated which can be made without departing from the spirit and scope of the described invention limited only by the claims appended hereto.

That which is claimed is:

1. A method of preparing a composition suitable for use as a drilling fluid additive or the like, comprising:
copolymerizing at least one hydrophilic vinyl monomer selected from the group consisting of acrylic acid, methacrylic acid and combinations thereof with at least one hydrophobic vinyl monomer selected from the group consisting of acrylic acid esters, methacrylic acid esters, vinyl esters of saturated monocarboxylic acids having from 1 to 3 carbon atoms, and combinations of any two or more thereof under anhydrous polymerization conditions in a liquid medium to produce a copolymer; and
contacting said resulting copolymer in said liquid medium with anhydrous ammonia to produce the salt form of said resulting copolymer.

2. A method in accordance with claim 1 wherein said step of copolymerizing is conducted in the presence of a free radical initiator.

3. A method in accordance with claim 1 wherein said step of copolymerizing is conducted in the presence of a free radical initiator selected from the group consisting of azo compounds, organic peroxy compounds and mixtures of any two or more thereof.

4. A method in accordance with claim 1 wherein said step of copolymerizing includes contacting said monomers with a free radical initiator in the form of a 75 weight percent solution of t-butyl peroxypivalate in mineral spirits.

5. A method in accordance with claim 4 wherein said t-butyl peroxypivalate is present in said step of polymerizing in an amount in the range from about 0.05 to about 1.0 weight percent based on the total weight of said monomers.

6. A method in accordance with claim 5 wherein said t-butyl peroxypivalate is present in said step of polymerizing in an amount in the range from about 0.1 to about 0.8 weight percent based on the total weight of said monomers.

7. A method in accordance with claim 1 wherein said at least one hydrophilic vinyl monomer comprises acrylic acid and said at least one hydrophobic vinyl monomer comprises methyl methacrylate.

8. A method in accordance with claim 1 wherein said liquid medium comprises an inert low chain transfer organic liquid medium selected from the group consisting of n-pentane, n-hexane, cyclohexane, chlorofluorocarbons and mixtures of any two or more thereof.

9. A method in accordance with claim 1 wherein said at least one hydrophilic vinyl monomer is acrylic acid and the mole ratio of said acrylic acid to said at least one hydrophobic vinyl monomer is in the range from about 7:1 to about 1:1.

10. A method in accordance with claim 1 wherein said at least one hydrophilic vinyl monomer is acrylic acid and the mole ratio of said acrylic acid to said at least one hydrophobic vinyl monomer is in the range from about 3.5:1 to about 2:1.

11. A method in accordance with claim 7 wherein the mole ratio of said acrylic acid to said methyl methacrylate is in the range from about 3.2:1 to about 2.1:1.

12. A method in accordance with claim 1 wherein said at least one hydrophilic vinyl monomer consists of acrylic acid and said at least one hydrophobic vinyl monomer comprises methyl methacrylate and vinyl acetate, said acrylic acid, methyl methacrylate and vinyl acetate being present in a mole ratio in the range from about 2.8:1:0.33 to about 8.3:1:3.5.

13. A method in accordance with claim 1 wherein said at least one hydrophilic vinyl monomer consists of acrylic acid and said at least one hydrophobic vinyl monomer comprises methyl methacrylate and vinyl acetate, said acrylic acid, methyl methacrylate and vinyl acetate being present in a mole ratio in the range from about 4.8:1:0.58 to about 9.7:1:2.3.

14. A method in accordance with claim 1 wherein said at least one hydrophilic vinyl monomer consists of acrylic acid and said at least one hydrophobic vinyl monomer comprises methyl methacrylate and vinyl acetate, said acrylic acid, methyl methacrylate and vinyl acetate being present in a weight ratio in the range from about 60:30:10 to about 60:10:30 based on the total weight of said monomers present in said copolymerizing step.

15. A method in accordance with claim 1 wherein said at least one hydrophilic vinyl monomer consists of acrylic acid and said at least one hydrophobic vinyl monomer comprises methyl methacrylate and vinyl acetate, said acrylic acid, methyl methacrylate and vinyl acetate being present in a weight ratio in the range from about 70:20:10 to about 70:10:20 based on the total weight of said monomers present in said copolymerizing step.

16. A method in accordance with claim 7 wherein said acrylic acid and said methyl methacrylate are present in a weight ratio in the range from about 70:30 to about 60:40, based on the total weight of said acrylic acid and said methyl methacrylate present in said copolymerizing step.

17. A method in accordance with claim 1 wherein said liquid medium comprises an inert, low chain transfer, organic liquid medium, and the weight ratio of said monomers to said inert, low chain transfer, organic liquid medium is in the range from about 5:95 to about 30:70.

18. A method in accordance with claim 1 wherein said liquid medium comprises an inert, low chain transfer, organic liquid medium, and the weight ratio of said monomers to said inert, low chain transfer, organic liquid medium is in the range from about 10:90 to about 29:80.

19. A method in accordance with claim 1 wherein said polymerizing step is performed at a polymerization temperature in the range from about 50° C. to about 70° C.

20. A method in accordance with claim 1 wherein said polymerization step is performed at a polymerization temprature in the range from 50° C. to about 70° C.; and wherein said period of polymerization time is in the range from about 10 minutes to about 30 hours.

21. A method in accordance with claim 1 wherein said period of polymerization time is in the range from about 10 minutes to about 30 hours.

22. A method in accordance with claim 1 characterized further to include:
drying the salt form of said resulting copolymer produced by the contacting step to produce a dried copolymer salt.

23. A method in accordance with claim 22 wherein said anhydrous ammonia is present in a quantity sufficient to raise the pH of the dried copolymer salt in a polymer solution in water of at least about 1 wt. % concentration to a value in the range from about 5.3 to about 12.

24. A method of preparing a composition suitable for use as a drilling fluid, comprising:
adding a quantity of the dried polymer salt produced in accordance with said drying step as defined in claim 23 to a quantity of a mixture comprising water and a clay substance suspended in said water; and mixing said dried polymer salt, said water and said clay substance to produce a drilling fluid.

25. A method in accordance with claim 24 wherein said anhydrous ammonia is present in a quantity sufficient to raise the pH of the dried copolymer salt in a polymer solution in water of at least about 1 wt. % concentration to a value in the range from about 7 to about 12.

26. A method in accordance with claim 1 wherein said at least one hydrophilic vinyl monomer comprises methacrylic acid and said at least one hydrophobic vinyl monomer comprises methyl acrylate.

27. A method in accordance with claim 1 wherein said at least one hydrophilic monomer comprises methacrylic acid.

28. A method in accordance with claim 27 wherein said at least one hydrophobic vinyl monomer comprises methyl methacrylate.

29. A method in accordance with claim 28 wherein said methacrylic acid and said methyl methacrylate are present in a weight ratio in the range from about 95:5 to about 46:54, based on the total weight of said methacrylic acid and said methyl methacrylate present in said copolymerizing step.

* * * * *

UNITED STATES PATENT AND TRADEMARK OFFICE
CERTIFICATE OF CORRECTION

PATENT NO. : 4,548,982

DATED : October 22, 1985

INVENTOR(S) : Earl Clark, Jr., et al.

It is certified that error appears in the above-identified patent and that said Letters Patent is hereby corrected as shown below:

Column 11, line 16, "29:80" should read -- 20:80 --.

Signed and Sealed this

Seventh Day of January 1986

[SEAL]

Attest:

DONALD J. QUIGG

Attesting Officer

Commissioner of Patents and Trademarks